United States Patent
Gerashchenko

(10) Patent No.: US 11,027,807 B2
(45) Date of Patent: Jun. 8, 2021

(54) SCREW PROPELLER WITH SAFETY COUPLING

(71) Applicant: Eduard Arkadjevich Gerashchenko, Moscow (RU)

(72) Inventor: Eduard Arkadjevich Gerashchenko, Moscow (RU)

( * ) Notice: Subject to any disclaimer, the term of this patent is extended or adjusted under 35 U.S.C. 154(b) by 0 days.

(21) Appl. No.: 15/576,831

(22) PCT Filed: May 27, 2016

(86) PCT No.: PCT/RU2016/000322
§ 371 (c)(1),
(2) Date: Nov. 26, 2017

(87) PCT Pub. No.: WO2016/190784
PCT Pub. Date: Dec. 1, 2016

(65) Prior Publication Data
US 2018/0162505 A1    Jun. 14, 2018

(51) Int. Cl.
*B63H 23/34* (2006.01)
*B63H 1/15* (2006.01)
(Continued)

(52) U.S. Cl.
CPC .............. *B63H 1/15* (2013.01); *B63H 1/14* (2013.01); *B63H 1/20* (2013.01); *B63H 20/34* (2013.01);
(Continued)

(58) Field of Classification Search
CPC .............. B63H 23/34; B63H 2023/342; B63H 2023/344; B63H 2023/346; B63H 1/14;
(Continued)

(56) References Cited

U.S. PATENT DOCUMENTS 7,086,836 B1 * 8/2006 Sheth .................... B63H 23/34
416/134 R

FOREIGN PATENT DOCUMENTS

EP    1961655      8/2008
RU    2012-123151  12/2013

OTHER PUBLICATIONS

GOST23360-78 Basic norms of interchangeability. Keys couplings with prismatic keys. Keys dimentions & keyways sections. Limits & fits. Moscow "Standard" 1-8-93, p. 3-6,19.

* cited by examiner

*Primary Examiner* — Andrew Polay
(74) *Attorney, Agent, or Firm* — Aleksandr Smushkovich

(57) ABSTRACT

The present device relates to boatbuilding, and more particularly to screw propellers with safety couplings, intended for use in outboard motors and/or marine screw propellers. A screw propeller with a safety coupling comprises a screw propeller body-cum-hub, a drive coupling, a driven coupling, and a dowel pin. The driven coupling is disposed for rotation on a spacer bushing, said spacer bushing being a tail bushing of the driving coupling. The driven coupling is partially or completely disposed in an opening in the screw propeller body-cum-hub and transmits torque to the screw propeller body-cum-hub by means of a longitudinal dowel pin and/or longitudinal grooves and a spline coupling. A common opening for the dowel pin in the driving and/or the driven coupling is configured as a through opening, and/or the blind end of the opening for the dowel pin is connected by a transverse opening to the outside surface.

9 Claims, 1 Drawing Sheet

(51) Int. Cl.
  *B63H 1/14* (2006.01)
  *B63H 1/20* (2006.01)
  *B63H 20/34* (2006.01)
  *F16F 15/126* (2006.01)

(52) U.S. Cl.
  CPC ........... *B63H 23/34* (2013.01); *F16F 15/126* (2013.01); *B63H 2023/342* (2013.01)

(58) Field of Classification Search
  CPC .. B63H 1/20; B63H 20/34; B63H 1/15; F16F 15/126
  See application file for complete search history.

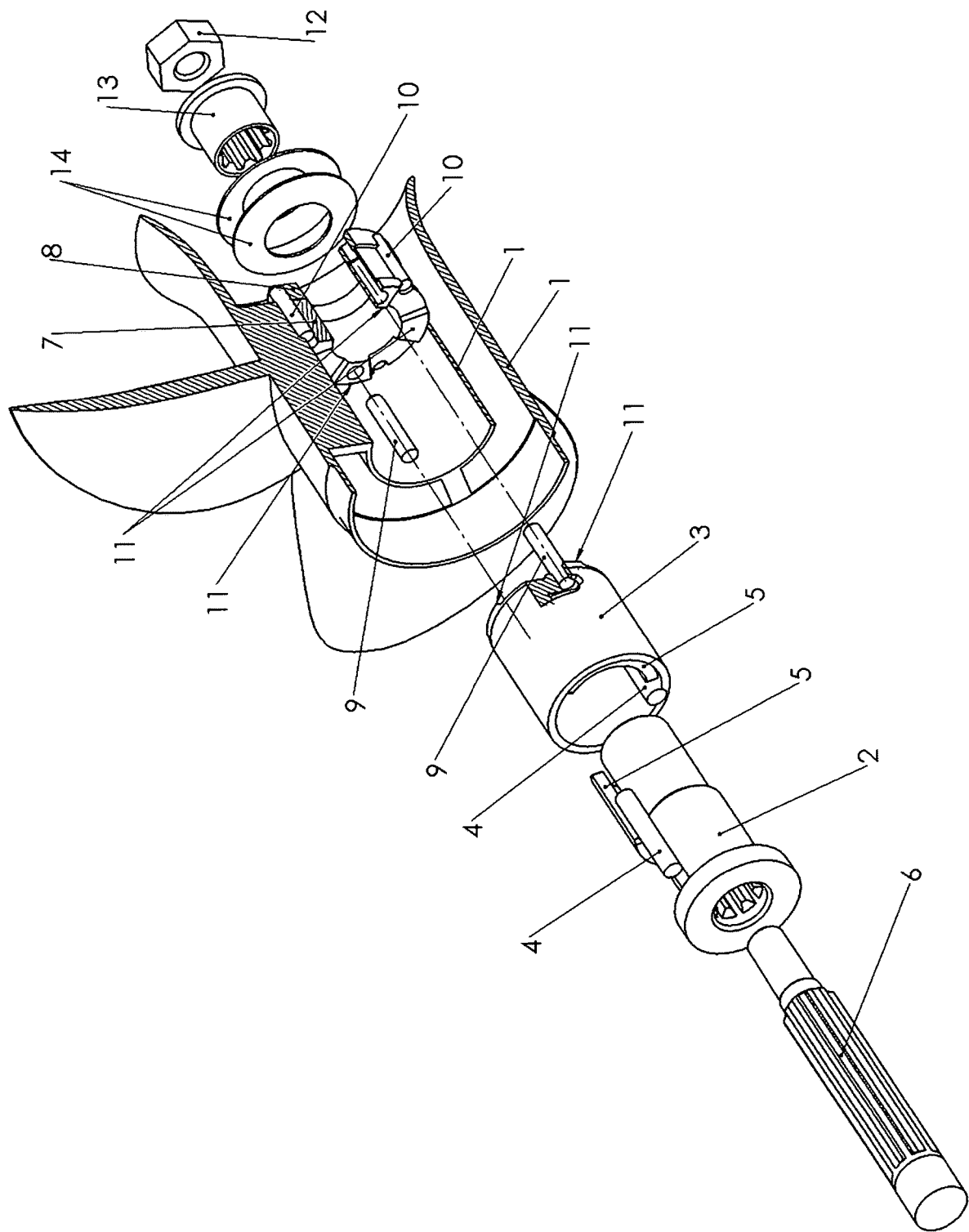

SCREW PROPELLER WITH SAFETY COUPLING

CROSS-REFERENCE TO RELATED APPLICATIONS

This application is a U.S. national stage application of a PCT application PCTRU2016/000322 filed on 27 May 2016, whose disclosure is incorporated herein in its entirety by reference, which PCT application claims priority of a Russian Federation application RU2015120245 filed on 28 May 2015.

FIELD OF THE INVENTION

The screw propeller with safety coupling (B63H 1/14, B63H 23/34) is intended for use in outboard motors and(or) in a screw propeller mover of ships to reduce the risk of damage of propeller blades and a mechanism of its mover in case of hitting an obstacle; the screw propeller is rotated on the propeller's shaft at exceeding a certain value of torque transmitted through the screw propeller.

BACKGROUND OF THE INVENTION

An analogue and a prototype (the closest related art device) of the invention is a screw propeller with safety coupling (patent application RU #2012123151 published 5 Jun. 2012). The screw propeller with safety coupling contains a screw propeller body-cum-hub, a driving coupling, mounted on a propeller shaft and received a torque from the propeller shaft, a driven coupling, connected with the screw propeller body-cum-hub for the transmission of torque to the screw propeller, a dowel pin for the transmission of torque between the couplings and a common opening for the dowel pin, which is oriented along an axis of the propeller shaft and passes through an end surface of the driving and the driven coupling.

Additionally, in other variants (but not necessarily for the workability of the beginning, basic design) it may include a damper of torque in composition of driving and(or) driven coupling, end splines and(or) the cams on the end faces of the driving and driven coupling, the stopping nut on the end of the propeller shaft, a compression spring between the stopping nut and coupling.

The disadvantage of the prototype is an insufficiently detailed design and execution of constructional elements; therefore it is not the optimal design solution from the point of view of reliability and durability, manufacturability of some constructional elements. The technical result of the invention is a more detailed elaboration and improvement of the design of the screw propeller with a safety coupling with using a safety dowel pin therewith for the purpose of increasing reliability, manufacturability and ease of using.

BRIEF DESCRIPTION OF DRAWINGS OF THE INVENTION

FIG. 1 shows a schematic design of the screw propeller with safety coupling; this design shows one of the variants of the invention, which are described in independent and dependent claims.

DESCRIPTION OF PREFERRED EMBODIMENTS OF THE INVENTION

While the invention may be susceptible to embodiment in different forms, there are described in detail herein, specific embodiments of the present invention, with the understanding that the present disclosure is to be considered an exemplification of the principles of the invention, and is not intended to limit the invention to that as exemplified herein.

The screw propeller with safety coupling comprises the screw propeller body-cum-hub 1. Safety coupling comprises the driving and driven coupling. Driving coupling 2,3 comprises a torque damper, which consists of a driving bushing 2 and a driven bushing 3 with an annular gap between them. There are thrust elements 4 on the driving and driven bushings 2,3, and damper element 5 is disposed in an annular segmental space between the bushings 2,3 and the thrust elements 4.

The driving coupling 2,3 is disposed on the propeller shaft in front (at outcoming area of the propeller shaft from gear box body and(or) holder) and enters in gearing with it by longitudinal splines for accepting the torque, father the driving coupling transmits torque to the driven coupling 7,8, which is disposed and rotates on a spacer bushing 2, which is also a tail bushing 2 of the driving bushing. The driven coupling 7,8 can also move in longitudinal direction on the space bushing relatively to the propeller shaft.

The driving 2,3 and driven 7,8 coupling are faced to each other with its end surface. The common opening in the couplings for the dowel pin 9 passes through an end surface of the couplings, and an axis of the opening is disposed along the propeller shaft axis. The dowel pin 9 is disposed simultaneously in the opening of two couplings and provides torque transmission between driving 2,3 and driven 7,8 coupling. The driven coupling is connected with the propeller body-cum-hub 1 for torque transmission by longitudinal dowel pin 10, instead dowel pin 10 is possible to use spline connection with longitudinal splines, disposed in place similarity to placement of dowel pin 10. The driven coupling is disposed partly in the opening of propeller body-cum-hub and consists of two parts 7 and 8, divided transversely to a longitudinal axis and connected together in the axial direction, for example by means of bolt through an opening (not shown), disposed similarity to the opening of the dowel pin 9. With it the parts 7,8 of the driven coupling by with its end surfaces and(or) provided collars-ledges rest on relative end surface and(or) internal collar of the opening of the screw propeller body-cum-hub 1, that way the screw propeller body-cum-hub 1 is fixed between the parts 7 and 8 of the driven coupling in the axial direction.

On the end faces of couplings 2,3 and 7,8, which are faced to each other, there are end, trapezoidal splines 11. During torque transmission between the couplings by means of the dowel pin 10, tops of end splines 11 of couplings are located opposite each other and can't transmit a torque. After shearing of safety dowel pin 9 the driven coupling 7,8 with the screw propeller can rotate relatively the driving coupling 2,3 and move along the propeller shaft for entry of the end splines into gearing to each other and for torque transmission between the couplings.

A stopping nut 12 is disposed on the end of the propeller shaft 6, it holds and(or) fixates the screw propeller with safety coupling on the propeller shaft.

A thrust washer-bushing 13 is disposed between the stopping nut 12 and the driven coupling 7,8. The thrust washer-bushing 13 has on its ending of bushing end splines for gearing with relative face splines on tail bushing 2 of the driving coupling and(or) has inner, longitudinal splines for gearing with relative longitudinal splines of the propeller shaft 6, that fixes from rotation relatively the propeller shaft and eliminates the torque transmission on the nut 12.

A spring 14 (disk type) is disposed between the stopping nut 12 and movable in the longitudinal direction the driven coupling 7,8. With shearing of the dowel pin 9 the spring 14 acts on the driven coupling 7, 8 and aligns the couplings 2,3 and 7,8 for entering into gearing end, trapezoidal splines 11, that enables torque transmission between the couplings and further to the propeller body-cum-hub with shearing dowel pin 9, the permissible value of the transmitted torque depends on the spring force and parameters of the end splines.

The claimed technical result is achieved by, that the screw propeller with safety coupling comprises: a screw propeller body-cum-hub 1, a driving coupling 2,3, mounted on a propeller shaft 6 and received a torque from the propeller shaft, a driven coupling 7,8, connected with the screw propeller body-cum-hub 1 for the transmission of torque to the screw propeller, a dowel pin 9 for the transmission of torque between the couplings, a common opening for the dowel pin, which is oriented along an axis of the propeller shaft and passes through an end surface of the driving 2,3 and the driven 7,8 couplings.

The difference is in that the driven coupling is disposed for rotation on a spacer bushing 2. Additionally, as an option, the spacer bushing is used as a tail bushing of the driving coupling.

Such solution for the driven coupling allows to avoid wear and(or) damage of the propeller shaft and its splines and increases the reliability and durability of working.

The difference is in that the driven coupling 7,8 is partially or completely disposed in an opening in the screw propeller body-cum-hub 1 and transmits torque to the screw propeller body-cum-hub by means of a longitudinal dowel pin 10 and(or) longitudinal grooves and a spline coupling. Additionally, as an option, the dowel pin 10 has a circular cross section and enters in a relative groove-slot in the driven coupling 7 and in the screw propeller body-cum-hub 1, having in a cross section a shape of a segment of a circle. Additionally, as an option, the groove-slot for the dowel pin 10 and(or) for spline and(or) for spline groove is disposed circumferentially and opposite for a longitudinal element-crosspiece (not shown), connecting an inner and outer bushing of the screw propeller body-cum-hub, when there is a through, annular channel between the bushings of the body-cum-hub 1 for an exhaust exit.

The difference is in that the driven coupling 7,8 is disposed partially and(or) fully in an opening in the screw propeller body-cum-hub 1 and consists of two parts 7 and 8, divided transversely to a longitudinal axis and connected together in the axial direction (for example, by bolt through the opening—not shown). With it the parts of the driven coupling 7,8 with its end surfaces and(or) provided collars-ledges rest on relative end surface and(or) internal collar of the opening of the screw propeller body-cum-hub 1, that way the screw propeller body-cum-hub is fixated between the parts of the driven coupling in the axial direction.

Such solution for the connecting of the driven coupling with the screw propeller body-cum-hub provides high reliability, compactness, and manufacturability.

The difference is in, that the opening for the dowel pin 9 in the driving 2,3 and(or) driven 7,8 coupling is configured as a transverse opening, and(or) the blind end of the opening for the dowel pin is connected by a transverse opening to the outside surface of the coupling. Additionally, as an option, the transverse opening for the dowel pin has a larger diameter from the dowel pin input side on part of its length and a smaller diameter of the remaining part of the opening from the side of imaginary output.

The difference is in, that the dowel pin 9 at least at one side has a conical and(or) rounded shape of its end surface.

Such solution for the dowel pin and for the opening for it in the couplings allows to simplify the assembly and disassembly of the mechanism and removing cut parts of dowel pin from the coupling.

The screw propeller with safety coupling can comprise additionally a damper in driving 2,3 and (or) in driven coupling. The damper is made as two coaxial bushings 2,3 with an annular gap between them; the bushings of the damper have thrust exposed elements 4 on the surface, a damping element 5 is disposed in an annular segmental space between the bushings and the thrust elements 4.

The difference is in that the driving 2 and(or) driven 3 bushing of the damper has a longitudinal groove-slot for the thrust element 4 on the surface facing to the annular gap, the longitudinal groove-slot and the thrust element in cross section has a shape of a circle and(or) of a circle segment. Such decision for the damper provides the reliability of its components and manufacturability.

The screw propeller with the safety coupling can additionally comprise face trapezoidal splines 11 on end faces of the driving 3 and driven 7 couplings, a stopping nut 12 on the end of the propeller shaft.

The difference is in that during the transmission of torque using end trapezoidal splines 11 between the couplings, the splines keep the contact by side faces (surfaces) in the geometric area (field) during the turning around the longitudinal axis of rotation and the beginning of side faces slide relative to one another with simultaneous movement of the couplings from each other along the axis. As an option, the side faces (surface) of the end trapezoidal splines at least partially are formed geometrically by a collection (set) of straight line segments that are perpendicular to the axis of rotation of the couplings and intersect with this axis of rotation.

Such solution for the damper increases the reliability and working life.

The difference is in that between the stopping nut 12 on the end of the propeller shaft 6 and the propeller body-cum-hub 1 and(or) the coupling 9 there is disposed a thrust washer-bushing 13, which is fixed from turning and(or) rotation relatively to the propeller shaft 6. Additionally, as an option, the thrust washer-bushing 13 has at its end face splines for gearing with relative face splines on tail bushing of the driving coupling 2 and(or) has inner, longitudinal splines for gearing with relative longitudinal splines of the propeller shaft 6.

Such solution eliminates the transmission of the torque on the stopping nut from driven coupling during nut's rotation or turning relatively to the propeller shaft (for example, when dowel pin cutting happens) and reduces the risk of accidental unscrewing of the stopping nut.

Operation of the Invention

The screw propeller with safety coupling contains a screw propeller body-cum-hub 1, a driving coupling 2,3, mounted on a propeller shaft 6, enters in gearing with it by longitudinal splines and accepts torque from it. In general case, a method of gearing of the driving coupling 2,3 with the propeller shaft 6 for torque transfer can be different.

The driven coupling 7,8 accepts torque from the driving coupling 2,3, the driving 2,3 and driven 7,8 couplings are faced to each other with its end surfaces, safety dowel pin 9 for torque transfer is disposed in common opening of the driving and driven couplings, along the propeller shaft axis.

The driven coupling is connected with the propeller body-cum-hub 1 for torque transmission by longitudinal dowel pin 10 for torque transfer on the screw propeller. The driven coupling consists of two parts 7 and 8, divided transversely to a longitudinal axis and connected together in the axial direction, for example by means of bolt through an opening (not shown). With it the parts 7,8 of the driven coupling by with its end surfaces and(or) provided collars-ledges rest on relative end surface and(or) internal collar of the opening of the screw propeller body-cum-hub 1, that way the screw propeller body-cum-hub 1 is fixed between the parts 7 and 8 of the driven coupling in the axial direction.

The driven coupling 7,8 together with the screw propeller is disposed on spacer bushing 2, which is a tail bushing of the driving coupling 2,3 and can rotate relatively the propeller shaft and move along its longitudinal axis.

There is shown in FIG. 1 a variant of design, wherein the driving coupling 2,3 is connected to the propeller shaft 6 by means of longitudinal splines to transmit torque and can also move along its longitudinal axis of the propeller shaft and the screw propeller. This way the driving coupling 2,3 and(or) the driven coupling 7,8 can move along the axis of the propeller shaft relatively to each other, approaching or leaving its end faces with end slots 11.

The order of the driving and driven couplings placement on the propeller shaft may be different—for example, the driving coupling 2,3 can be positioned behind the driven coupling 7,8, closer to the end of the propeller shaft 6, or conversely ahead (as in FIG. 1).

For assembly of the screw propeller with safety coupling in driving coupling 2,3 is inserted the dowel pin 9, further the screw propeller body-cum-hub 1 together with the connected driven coupling 7,8 are dressed up on the driving coupling 2,3 so, that the openings for the dowel pin in the couplings are disposed opposite each other, the dowel pin 9 takes place in the joint opening in both couplings.

For convenience and simplification of the assembly protruding from the driving coupling the dowel pin 9 has a conical and(or) a rounded shape of end face, which makes it easier to get into the corresponding opening in the driven coupling.

For easy removal of the dowel pin 9 after its cutting the opening for the dowel pin is made in the coupling through (and stepped in diameter to avoid loss) and(or) a blind end of the opening for the dowel pin is connected by a transverse opening with the outer surface of the coupling. This allows to remove easy the parts of the dowel pin from the couplings after cutting using a thin rod.

The assembled screw propeller together with the safety coupling, as a unit, is dressed on the propeller shaft 6. In this state, the screw propeller is able to accept the torque from the propeller shaft and to be in working condition.

For fixing of the screw propeller on the propeller shaft, a lock nut 12 is provided at the end of the propeller shaft 6.

Thrust washer-bushing 13 is disposed between the stopping nut 12 and the driven coupling 7,8. Thrust washer-bushing 13 has on its end face the end splines for gearing with relative end splines on tail bushing 2 of driving coupling and(or) internal longitudinal splines for gearing with the longitudinal splines of the propeller shaft 6, that fixes the thrust washer-bushing from rotation, and(or) rotation relatively to the propeller shaft and eliminates the torque transmission on the nut 12, thereby reducing the risk of unscrewing of the stopping nut and its loss.

Due to the presence of longitudinal backlash-gap in the gearing of end splines of thrust washer-bushing 13 with tail bushing 2 and(or) the mobility of a longitudinally splined connection with the propeller shaft 6, thrust washer-bushing 13 can also move along the axis of the propeller shaft by a distance sufficient for gearing of the end splines 11 of the couplings.

The driving and(or) driven coupling can include in its composition a damper for smoothing peaks of torque in the moment of switching on of the turn and start of the propeller shaft rotation (the presence of the damper is not a necessary condition of workability).

As one of the variant, the design of the damper in the driving coupling is made of two coaxial bushings 2 and 3 with an annular gap between them, the bushings 2,3 of damper have exposed, thrust elements 4 on the surface, and the damping element 5 is disposed in annular, radial space between the bushings 2,3 and the thrust elements 4.

At the end faces of the driving and driven couplings are arranged (made) angular, trapezoidal slots 11. During torque transmission between the couplings by means of the dowel pin 9 the top end of the splines 11 of the couplings are located opposite each other and can't transmit a torque. After cutting of safety dowel pin 9 driven coupling 7,8 with the screw propeller can rotate relatively the driving coupling 2, 3 and move along the propeller shaft for entry of the end splines 11 into gearing with each other and torque transmission between the couplings.

The approaching of the couplings for gearing of the end splines can occur at tightening of stopping nut 12 and(or) automatically under the action of the spring 14 (for example, disc type) at its available, which is disposed between the stopping nut 12 and movable driven coupling 7,8 in longitudinal direction. When dowel pin 9 cutting happens the spring 14 acts on the driven coupling 7, 8 and aligns the couplings into gearing of angular, trapezoidal splines 11, that enables torque transmission between the couplings and further to the screw propeller with cut dowel pin, acceptable magnitude of transmitted torque depends on the spring force and parameters of the splines. By this way is possible working of safety coupling in automatic mode. At exceeding of some value of torque a repelling, axial force on the end splines 11, due to the inclination of the side face, will exceed the force of the spring 14, the couplings will diverge from each other in the axial direction and get end splines out of gear.

The invention claimed is:

1. A screw propeller with a safety coupling comprising: a screw propeller body-cum-hub, a driving coupling, mounted on a propeller shaft and receiving a torque from the propeller shaft, said driving coupling includes a spacer bushing; a driven coupling connected with the screw propeller body-cum-hub for transmission of the torque to the screw propeller body-cum-hub, said driven coupling is disposed and rotates on the spacer bushing; at least one dowel pin for transmission of the torque between the driving coupling and the driven coupling, said at least one dowel pin each consists of a forward portion and an aft portion; at least one common opening for receiving the at least one dowel pin;
    wherein said at least one common opening is oriented along a longitudinal axis of the propeller shaft, and wherein said forward portion passes through an end surface of the driving coupling and is disposed entirely within the driving coupling, while said aft portion passes through an end surface of the driven coupling and is disposed entirely within the driven coupling.

2. The screw propeller with the safety coupling according to claim 1, wherein the spacer bushing is formed as a tail bushing of the driving coupling.

3. A screw propeller with a safety coupling comprising: a screw propeller body-cum-hub, a driving coupling, mounted on a propeller shaft and receiving a torque from the propeller shaft, a driven coupling, connected with the screw propeller body-cum-hub for transmission of the torque to the screw propeller, a dowel pin for transmission of the torque between the driving coupling and the driven coupling, a common opening for the dowel pin, which is oriented along an axis of the propeller shaft and passes through an end surface of the driving coupling and the driven coupling;
  wherein the driven coupling is partially or completely disposed in an opening in the screw propeller body-cum-hub and transmits the torque to the screw propeller body-cum-hub by means of a longitudinal dowel pin or a spline connection; and
  the longitudinal dowel pin has a circular cross section and enters in a relative groove-slot in the driven coupling and in the screw propeller body-cum-hub, having, in a cross section, a shape of a segment of a circle with a flat side.

4. A screw propeller with a safety coupling comprising: a screw propeller body-cum-hub, a driving coupling, mounted on a propeller shaft and receiving a torque from the propeller shaft, a driven coupling, connected with the screw propeller body-cum-hub for the transmission of torque to the screw propeller, a dowel pin for transmission of the torque between the driving coupling and the driven coupling, a common opening for the dowel pin, which is oriented along an axis of the propeller shaft and passes through an end surface of the driving coupling and the driven coupling, wherein the driven coupling is disposed partially or fully in an opening in the screw propeller body-cum-hub and consists of two parts divided transversely to a longitudinal axis and connected together in the axial direction, with it the parts of the driven coupling with its end surfaces or provided collars-ledges rest on adjacent end surface or internal collar of the opening of the screw propeller body-cum-hub, that way the screw propeller body-cum-hub is fixed between the parts of the driven coupling in the axial direction.

5. A screw propeller with a safety coupling comprising: a screw propeller body-cum-hub, a driving coupling, mounted on a propeller shaft and receiving a torque from the propeller shaft, a driven coupling, connected with the screw propeller body-cum-hub for transmission of the torque to the screw propeller, a dowel pin for transmission of the torque between the driving coupling and the driven coupling, a common opening for the dowel pin, which is oriented along an axis of the propeller shaft and passes through an end surface of the driving coupling and the driven coupling, wherein the opening for the dowel pin in the driving coupling and the driven coupling is configured as a transverse opening, and the blind end of the opening for the dowel pin is connected by a transverse opening to the outside surface of the coupling.

6. The screw propeller with safety coupling according to claim 5, wherein the transverse opening has a larger diameter from the dowel pin input side on a part of its length and a smaller diameter of the remaining part of the opening from the side of imaginary output.

7. A screw propeller with a safety coupling comprising: a screw propeller body-cum-hub, a driving coupling, mounted on a propeller shaft and receiving a torque from the propeller shaft, a driven coupling, connected with the screw propeller body-cum-hub for transmission of the torque to the screw propeller, a dowel pin for transmission of the torque between the driving coupling and the driven coupling, a common opening for the dowel pin, which is oriented along an axis of the propeller shaft and passes through an end surface of the driving coupling and the driven coupling, a damper in the driving coupling is made of two coaxial bushings with an annular gap between them, the bushings of the damper have thrust exposed elements on the surface, a damping element is disposed in an annular segmental space between the bushings and the thrust elements, wherein the driving bushing and the driven bushing of the damper has a longitudinal groove-slot for the thrust element on the surface facing to the annular gap, the longitudinal groove-slot and the thrust element in cross section has a shape of a circle or a circle segment.

8. A screw propeller with a safety coupling comprising: a screw propeller body-cum-hub, a driving coupling, mounted on a propeller shaft and receiving a torque from the propeller shaft, a driven coupling, connected with the screw propeller body-cum-hub for transmission of the torque to the screw propeller, end, trapezoidal splines on end face of the driving coupling and the driven coupling, a dowel pin for transmission of the torque between the driving coupling and the driven coupling, a common opening for the dowel pin, which is oriented along an axis of the propeller shaft and passes through an end surface of the driving coupling and the driven coupling, a stopping nut on the end of the propeller shaft, wherein during transmission of the torque using the end, trapezoidal splines between the driving coupling and the driven coupling, the end, trapezoidal splines keep the contact by side surfaces in the geometric field during turning around the longitudinal axis of rotation and the beginning of side faces slide relative to one another with simultaneous movement of the driving coupling and the driven coupling from each other along the axis.

9. A screw propeller with a safety coupling to claim 8, wherein the side surface of the end, trapezoidal splines at least partially are formed geometrically by a collection set of straight line segments that are perpendicular to the axis of rotation of the couplings and intersect with this axis of rotation.

* * * * *